United States Patent [19]
Huston et al.

[11] Patent Number: 5,364,093
[45] Date of Patent: Nov. 15, 1994

[54] GOLF DISTANCE MEASURING SYSTEM AND METHOD

[76] Inventors: Charles D. Huston, 4607 Trail West Dr., Austin, Tex. 78735; Darryl J. Cornish, 8017 Davis Mountain Pass, Austin, Tex. 78726

[21] Appl. No.: 804,368

[22] Filed: Dec. 10, 1991

[51] Int. Cl.$^5$ .................. G01S 5/14; A63B 71/06
[52] U.S. Cl. .................. 273/32 R; 340/323 R; 273/32 H; 273/439; 364/444; 364/449
[58] Field of Search .......... 273/32 R, 32 H, 213, 273/439; 364/449, 443, 444, 410; 340/323 R, 995, 988, 990; 455/66, 95, 98, 99, 100; 342/457, 357, 118, 126, 352, 356, 450

[56] References Cited

U.S. PATENT DOCUMENTS

| | | | |
|---|---|---|---|
| 3,771,483 | 11/1973 | Bond | 364/444 |
| 4,656,463 | 4/1987 | Anders et al. | 340/572 |
| 4,656,476 | 4/1987 | Tavtigian | 273/32 R |
| 4,703,444 | 10/1987 | Storms, Jr. et al. | 273/32 H |
| 4,910,677 | 3/1990 | Remedio et al. | 273/32 R |
| 5,056,106 | 10/1991 | Wang et al. | 273/32 H |
| 5,086,390 | 2/1992 | Matthews | 340/323 R |
| 5,148,002 | 9/1992 | Kuo et al. | 219/211 |

FOREIGN PATENT DOCUMENTS

| | | | |
|---|---|---|---|
| 0189414 | 7/1990 | Japan | 364/443 |
| 0078678 | 4/1991 | Japan | 364/443 |
| 0092714 | 4/1991 | Japan | 340/995 |
| 1272656 | 9/1991 | Japan . | |
| 8706713 | 11/1987 | WIPO | 364/449 |

Primary Examiner—Jessica J. Harrison
Attorney, Agent, or Firm—Charles D. Huston

[57] ABSTRACT

A method and system for determing the approximate distance from a golf ball to the golf cup on the golf-green is described. The system stores the location of the golf cup in computer memory and determines the location of a global positioning satellite receiver positioned near the golf ball. The system calculates the distance between the golf cup location and the receiver location. Preferably, the receiver includes a display of the golf hole being played, with the location of the receiver on the hole, the golf cup on the green, and the distance to the golf cup being displayed. In a preferred form the player can designate a mark on the display and find out the distance from the receiver to the mark or the distance from the mark to the golf pin. The position of the receiver is error corrected, with the error correction preferably calculated using a reference global positioning satellite receiver positioned at a known location. The known location is compared to the apparent position to calculate the error correction. The error correction is periodically transmitted and the remote receiver calculates the distance from the remote receiver to the golf cup for the hole being played using the transmitted error correction. Using an error corrected position enables distance calculation accuracy to within several meters even using global positioning satellite system "c" code with selective availability enabled. The method and system of the present invention allows the golfer to accurately select the proper club for the shot, plan a shot strategy for the hole, and to decrease playing time.

26 Claims, 12 Drawing Sheets

Remote Unit

Base Station

Cup Locator

Packet Radio
Network

REMOTE UNIT
Calibration

REMOTE UNIT
Corrected
Position

Alternative
Embodiment

GOLF DISTANCE MEASURING SYSTEM AND METHOD

BACKGROUND OF THE INVENTION

1. Field of the Invention

The present invention relates to a method and apparatus for determining the distance between a golf ball and the golf cup. In particular, the method and apparatus uses a global positioning satellite receiver positioned near the golf ball to determine the approximate location of the golf ball.

2. Description of Related Art

In the game of golf it is important to know as accurately as possible the distance between the golf ball and the golf cup on the green. It is sometimes also desirable to know the distance between the golf ball and a hazard on the hole being played. Knowing these distances allows proper club selection and allows a player to formulate a hole management plan. For example, a player that knows the ball is 110 yards from the pin would select the appropriate club for 110 yards such as a 9 iron or one of the player's wedges.

Deane Beamon and Jack Nicklaus purportedly pioneered in professional tournament play the use of books containing yardage calculations. Most PGA professionals and serious amateurs now use course yardage books to determine the distance between the ball and the golf cup or a hazard on the hole being played. Yardage books are significantly more accurate than guessing the distance based on a visual inspection.

A significant drawback to the use of yardage books is the fact that the book must be prepared prior to the round of golf. Such preparation is inconvenient for most amateur play in recreational golf. Even where a yardage book is prepared, account must be made for the location of the tee markers, the location of the golf cup on the green for the particular day, and the position on the hole being played.

There are several alternatives to yardage books for determining the distance from the ball to the golf cup. Most courses mark the hole in some form with approximate distances to the middle of the green. For example, many courses mark the sprinkler heads with distance to the green, while other courses plant trees or post a marker at the 100 or 150 yard position from the middle of the green. Some courses have buried low power location beacons along their fairways and a receiver carried by the golfer receives the nearest beacon signal and indicates the distance of the beacon.

There are several disadvantages to known techniques for distance determination on golf courses. First, they are all have varying degrees of inaccuracy. Typically the distances follow some unknown line in the fairway and are calculated for the middle of the green. Inaccuracies of more than 10 yards are common which unfortunately can be the difference between a 6 foot putt and a sand trap. Second, most known techniques slow play by requiring the player to consult his yardage book or walk around searching for a distance marker and walking off the distance from the marker to the ball. Third, most techniques do not give an indication of the distance to most, if not all, of the hazards. For example, it is important to know the distance the ball needs to travel to carry a trap or water hazard in front of the green.

Therefore, a method and apparatus which could accurately and quickly determine the distance between the ball and the golf cup on the green would contribute to lower scores and faster play. Such a method and apparatus would be particularly advantageous if it also accounted for distance between the ball and an obstacle or hazard.

SUMMARY OF THE INVENTION

The problems outlined above are generally solved by the method and system of the present invention for determining distance on a golf course. The invention provides an accurate measure of distance from a golf ball to the golf cup on the green being played. Preferably the system includes a visual display of the golf hole being played, including the location of the pin on the green, the bunkers protecting the green, the hazards on the hole, as well as a readout of the distance from the ball to the golf cup. In an enhanced version the display includes a pointing device for the player to mark positions on the hole layout to determine distance between the ball and a marked position (a water hazard for example). Alternatively, the player can use this marking capability to determine distance between two marked positions to aid in hole planning.

Broadly speaking, the method of the present invention includes the steps of locating the location of the cup on the green, storing the location of the cup, and determining an error correction. A remote global positioning satellite system receiver is positioned near the ball on the hole being played. The apparent location of the GPS remote receiver is adjusted with the error correction to achieve a corrected location. The difference between the corrected location and the stored location of the golf cup is calculated to determine the approximate distance between the ball and the cup.

The error correction is determined by positioning a GPS receiver at a reference location having a known position. The GPS receiver determines an apparent position using the available global positioning satellites in view. The error correction is calculated based on the difference between the apparent position and the known position. The error correction is preferably broadcast periodically for use by the remote GPS receivers used by the golf players. Preferably, the position of the golf cups on the greens are determined when cup position is changed by placing a GPS receiver in the cup, determining an apparent position, and applying the error correction to obtain the golf cup position stored for use during play.

In the preferred embodiment, a base station is placed at the known position to continuously calculate and transmit the error correction. The remote receivers are optionally configured to periodically transmit their corrected position to the base station so that the course marshal can continuously monitor the progress of play. In an alternative form, the remote receiver is used to calculate an error correction for its own use. For example, a remote receiver mounted on a golf cart would be driven onto a placard designating a known location on each hole. The apparent GPS position of the remote receiver over the placard is compared with the known position to calculate an error correction for use during play of that hole.

BRIEF DESCRIPTION OF THE DRAWINGS

FIG. 7 comprises the flow charts illustrating the operation of a remote unit in accordance with the system of the present invention, where

DESCRIPTION OF THE PREFERRED EMBODIMENTS

Figure 1:
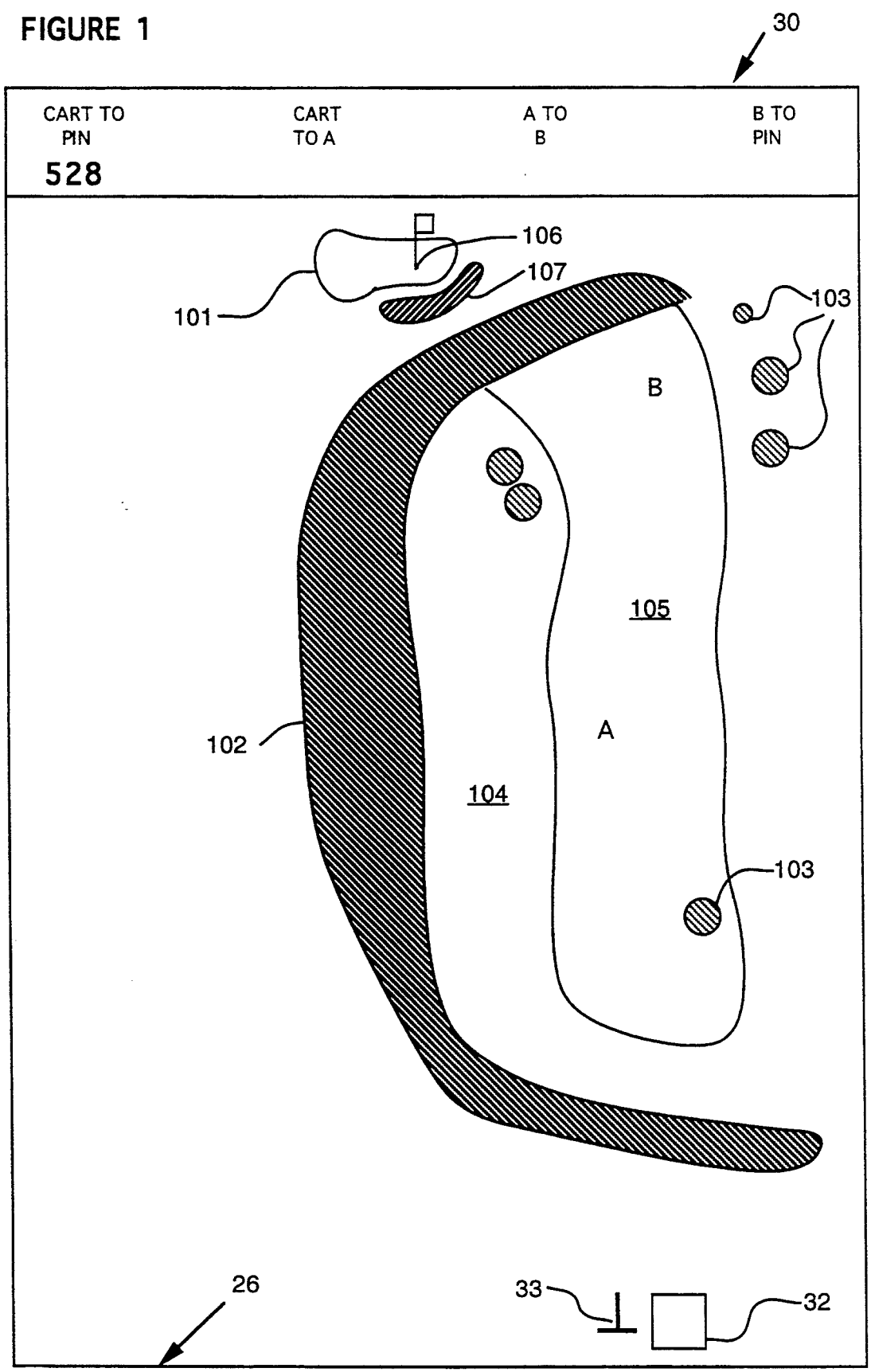
FIG. 1 is a schematic of a display of a golf hole layout.

The present invention utilizes the global positioning satellite system (GPS) to determine the approximate distance from a golf ball to the cup or pin on the green of the golf hole being played. GPS is a spaced based system of satellites which can provide to an infinite number of receivers accurate three dimensional position (i.e. horizontal location and altitude), velocity, and time. A general understanding of GPS is useful to appreciate the operation of the present invention. Numerous books and articles are available on GPS operation and theory. See e.g., GPS—A Guide to the Next Utility, Trimble Navigation (incorporated by reference for background).

THE GLOBAL POSITIONING SATELLITE SYSTEM

The GPS system is an umbrella of satellites circling the earth passively transmitting signals. Each satellite has a very accurate atomic clock which is periodically updated. A GPS receiver with an accurate clock can identify a satellite and determine the transit time of the signal from the satellite to the receiver. Knowing the transit time and knowing that the speed of light is 186,000 miles per second enables a calculation of the distance from the satellite to the receiver. The signal carries with it data which discloses satellite position and time of transmission, and synchronizes the GPS receiver with the satellite clocks.

If a GPS receiver can locate 3 or 4 satellites it can determine its distance from each satellite. The intersection of these 3 or 4 spheres enables a precise location of the receiver (and some compensation for timing errors in the receiver's internal clock). The GPS system should have 21 satellites and 3 spares once the system is fully deployed. Currently about 14 satellites are deployed, giving reasonable satellite coverage worldwide for most of the day.

There are basically two types of GPS receivers—P (precision) code and C/A (coarse availability) code. P code is for government use only and requires specialized equipment. C/A code receivers are becoming widely available with the continuing deployment of GPS satellites. One difficulty with C/A code receivers is that the government from time to time intentionally degrades the satellite signals—so called "selective availability." With selective availability turned on horizontal accuracy is on the order of 50-100 meters. With selective availability disabled horizontal accuracy can improve to around 15 meters.

THE BEST MODE

Turning to the drawings, the system of the present invention includes a remote unit 10, base station 12, and cup locator 14. A remote unit 10 accompanies the golfer during the round—for example mounted on the golf cart.

Figure 2:
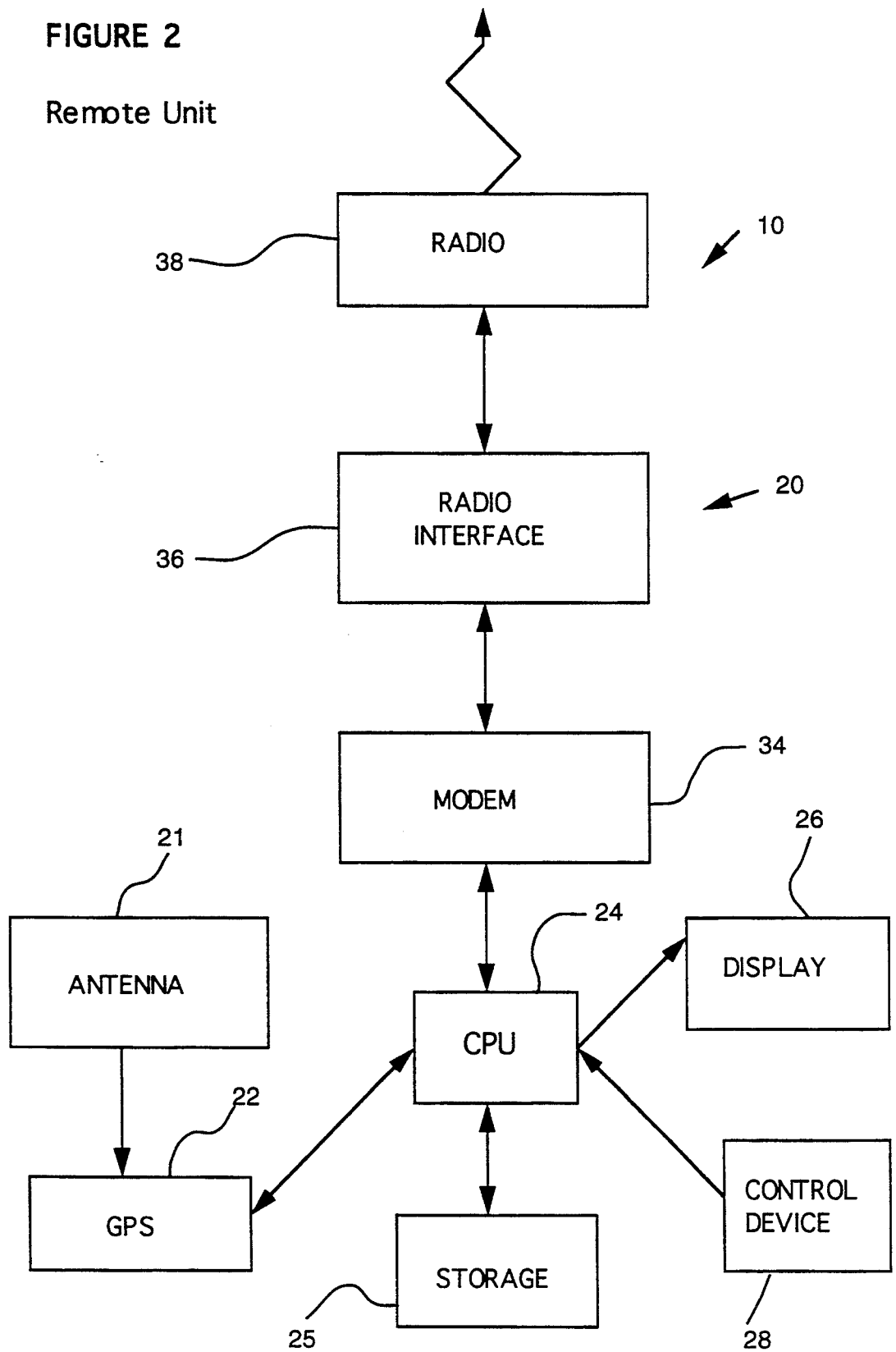
FIG. 2 is a block diagram of a remote unit including a GPS receiver in accordance with the present invention.

As shown in FIG. 2, the remote unit 10 includes a packet radio system 20, a GPS antenna 21 and receiver 22, a CPU 24, storage 25, a display 26, and a control device 28. The GPS receiver 22 is preferably the 3 channel receiver such as used in the TransPak Model made by Trimble Navigation of Sunnyvale, Calif. Other commercially available substitutes are acceptable such as made by Magellan, Sony, or Rockwell/Collins. The antenna 21 is either remote or internal to the receiver 22, but in any event is mounted on the golf cart for an upward look angle for optimum GPS signal reception.

The display 26 is illustrated in FIGS. 1 and 2. The display 26 is preferably a 640×480 pixel LCD supertwist, ISA bus compatible display, but other conventional types of displays are operable. The display depicts the layout of the hole being played, as well as a distance box 30 and present position icon 33. The CPU 24 is preferably an 8088 CMOS microprocessor operable at 10 MHz and ISA bus compatible. A control device 28 is coupled to the display 26 so that the player can optionally position one or two markers on the hole layout.

Figure 8:
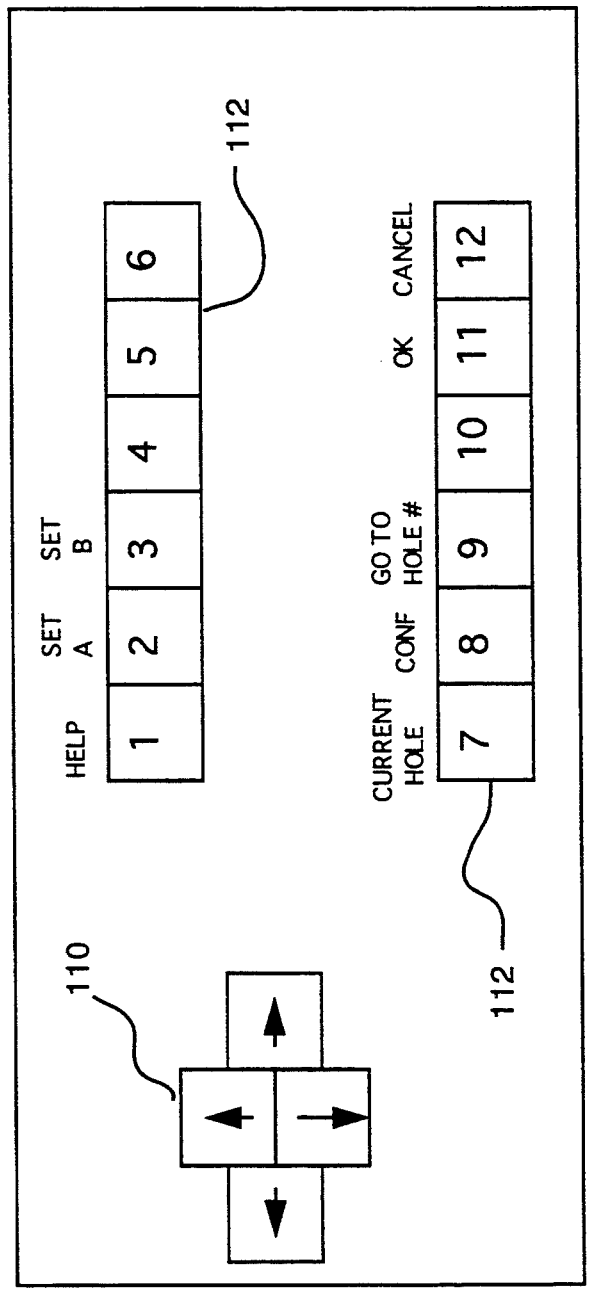
FIG. 8 depicts the layout of the control panel of the remote unit.

FIG. 8 illustrates one embodiment of the control device 28. The four direction keys 110 are used for marking locations on the hole (see FIG. 1, marks A and B). The twelve function keys 112 operate to function as labeled. While a pen based control system might be preferable functionally to the device 28 illustrated in FIG. 8, cost considerations prompted the choice of the device 28.

The storage 25 preferably includes nonvolatile memory which stores a database of the hole layouts (preferably bitmap), as well as the corrected location of the cup on each hole. Battery backed-up RAM is preferred, but other alternatives are operable and offer some advantages, such as a WORM optical disc coupled to RAM or EEPROM. Volatile memory stores the current error correction.

The packet radio system 20 is conventional, and includes modem 34, radio interface 36, and radio 38 (including an antenna, not shown). The radio system 20 is bi-directional in that it can receive error correction and other information as well as transmit present position back to the base station 12. A Celcom Electric packet radio modem 300-1200 baud for use with any commercial half duplex radio is believed preferable for the modem 34.

Figure 3:
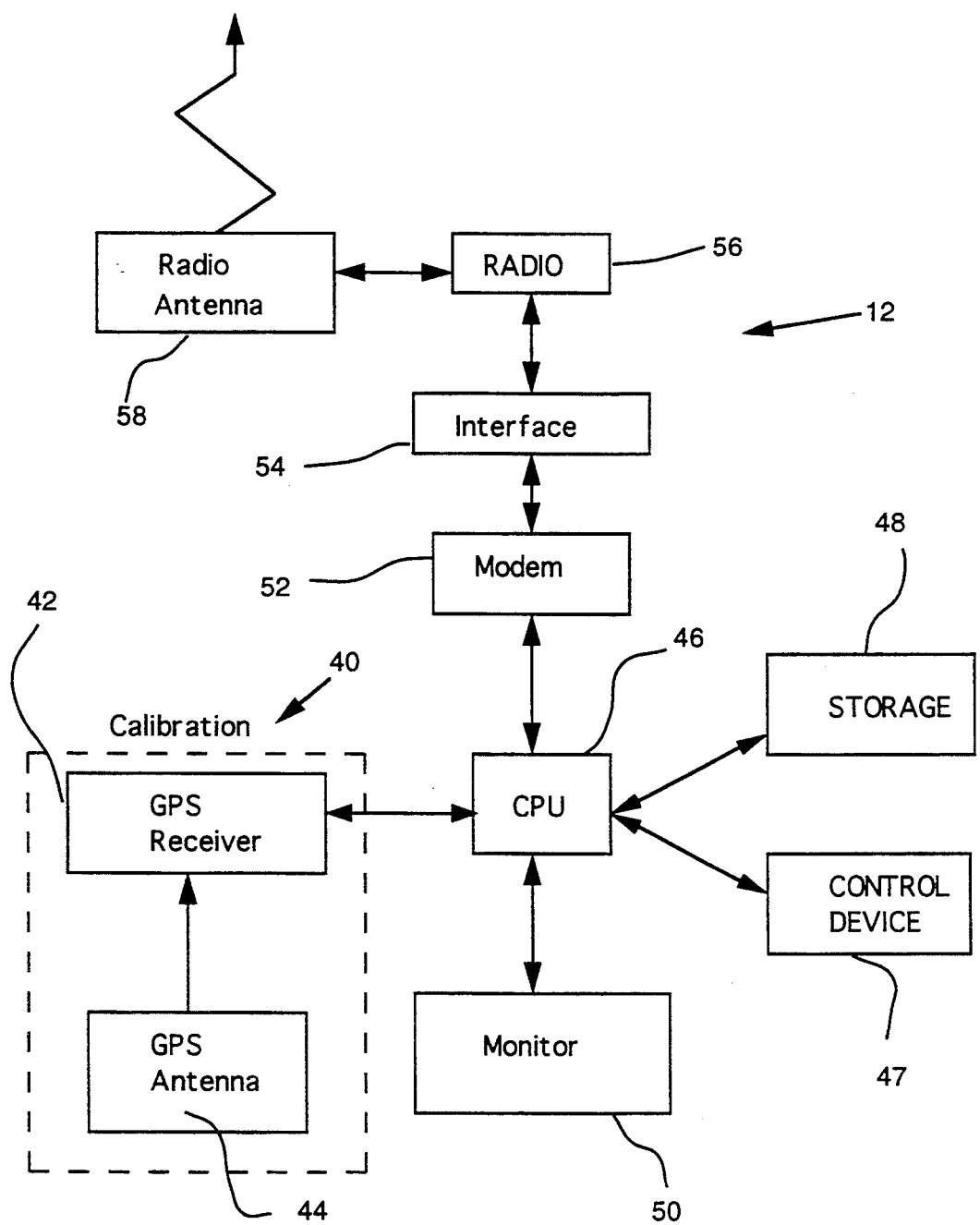
FIG. 3 is a block diagram of the base station in accordance with the present invention.

FIG. 3 illustrates the base station 12, which is desirably placed in the pro shop. The base station 12 includes a calibration section 40 which comprises a GPS receiver 42 and antenna 44. The calibration section 40 continuously determines apparent position of the antenna 44 and feeds this information to CPU 46. The CPU is conventional, such as a 386 or 486 type personal computer operating a 20 MHz. The control device 47 preferably includes a mouse and a standard keyboard.

The course geography database 48 is similarly connected to the CPU 46 and stores course information such as hole layout and the present position of the cups on the greens for the day. A monitor 50 is coupled to CPU 46 and is useful not only for initialization, but also is selectable to display the present position of all the remote receiver units 10 on the course. The base station 12 includes a packet radio system similar to FIG. 2 coupled to the CPU 46, and comprises modem 52, interface 54, radio 56 and radio antenna 58.

Figure 4:
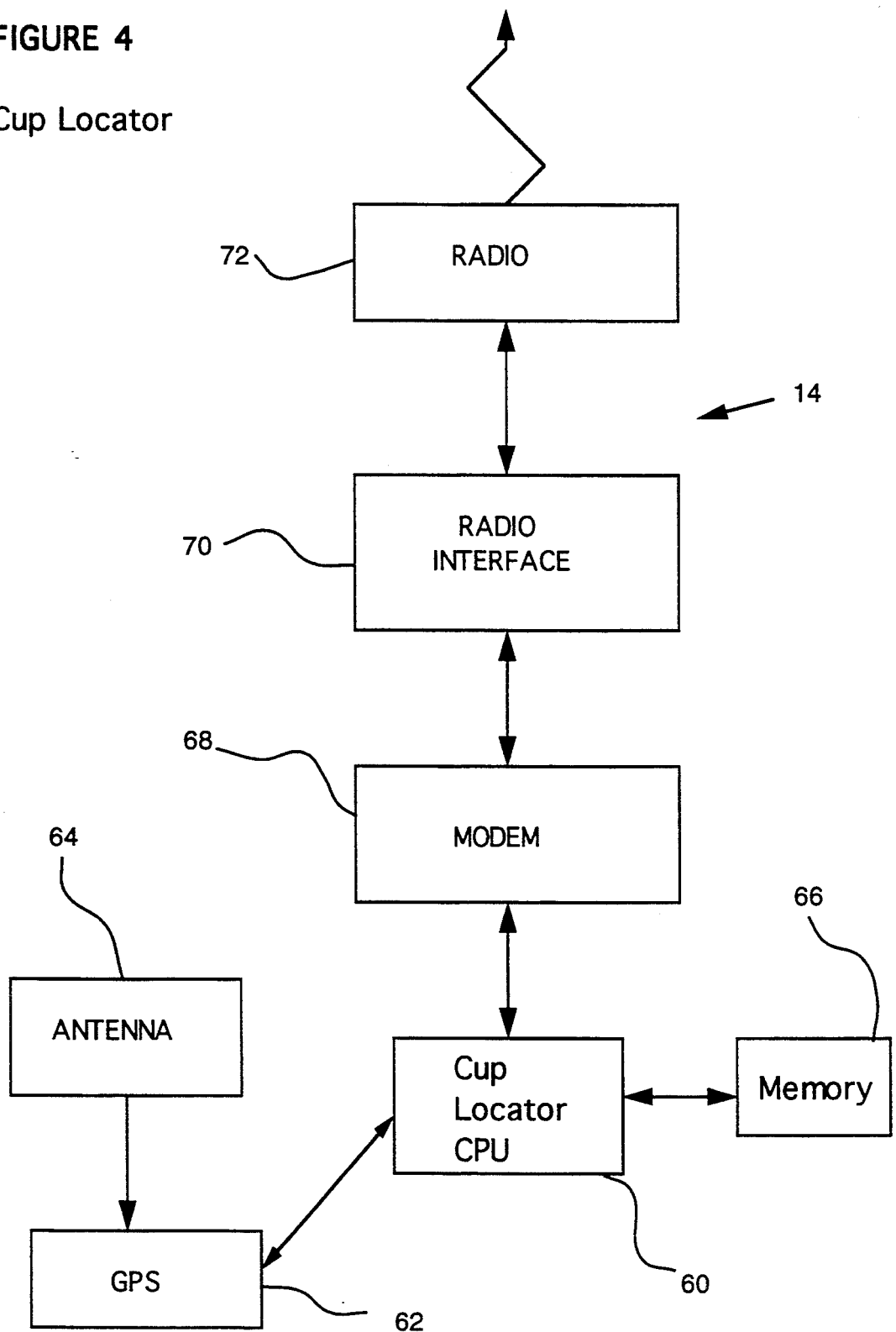
FIG. 4 is a block diagram of a cup locator unit used to locate the position of each golf cup on the respective green.

The Cup Locator 14 is illustrated in FIG. 4 and as can be seen is nearly identical to the remote unit of FIG. 2. A CPU 60 is coupled to a GPS receiver 62 which includes an antenna 64. Memory 66 is coupled to CPU 60 and stores the location of each cup as the cup locator 14 is moved from green to green. The location of each cup is also transmitted to the base station 12 using modem 68, radio interface 70, and radio 72.

OPERATION

Figure 5:
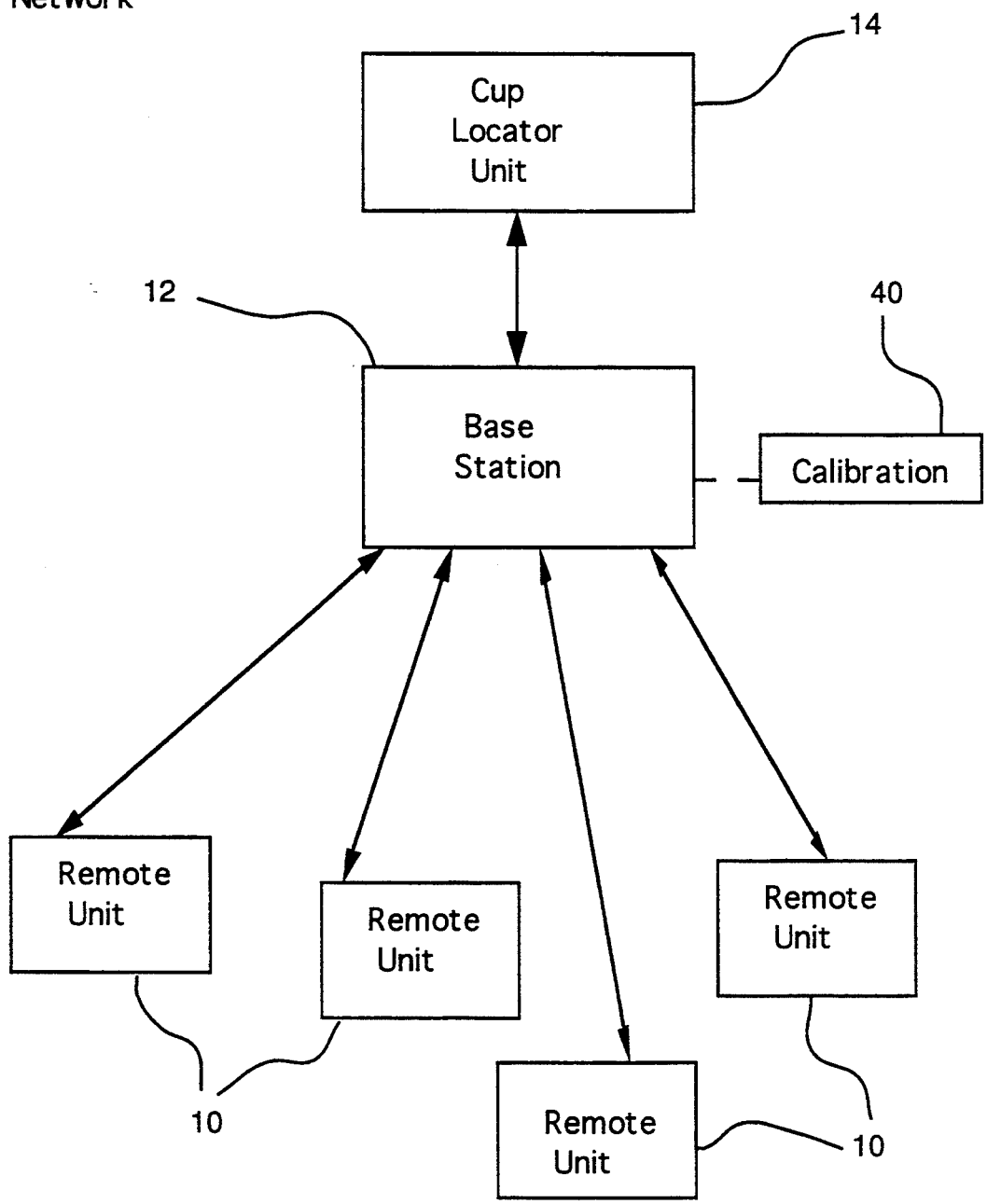
FIG. 5 is a schematic of the packet radio network used to transmit the error correction.

FIG. 5 illustrates schematically the operation of the system of the present invention. The cup locator unit 14 (FIG. 4) is transported from green to green when the location of the cups are changed. The greenskeeper positions the cup locator unit 14 over the new cup and allows a few seconds for the GPS receiver 62 to determine an apparent cup location. The first cup might take several minutes while the GPS receiver 62 consults its almanac and locates the satellites in view. Subsequent cups should take only a few seconds to determine an apparent location. Because the GPS receiver of FIG. 4 is a C/A code receiver, its best accuracy is about 15 meters (selective availability disabled, no correction) with a worst accuracy of about 100 meters.

The greenskeeper switches an "enter" pad (not shown) and hole number for each cup. The apparent position of the respective cup is transmitted to the base station and also stored in memory 66. As shown in FIG. 4, the modem 68 receives the digital information representing the cup number and apparent location and modulates an analog signal with the digital information. The modulated signal passes through interface 70 to radio 72 where it is transmitted to the base station 12. FIG. 5 shows schematically the passage of the radio transmission over the packet network to the base station 12. Typically, the greenskeeper would return to the base station after the cups are changed and verify that the cup information had been transmitted correctly—if not, the cup information stored in memory 66 would be downloaded to the base station 12.

The base station 12 stores the apparent cup locations in a course geography database in storage 48 of FIG. 3. Additionally, the course layout is stored in the database. Preferably, the calibration system 40 operates to calculate and apply an error correction to the cup apparent locations as they are received over the packet radio system at the base station 12. These corrected cup locations are stored in the course geography database for later use. Alternatively, the cup apparent locations can be downloaded and an error correction applied at the time of downloading to obtain corrected position for each cup.

Correcting the apparent cup locations as close as possible to the time of acquisition is advantageous. Without correction, the following errors are present: satellite clock error; receiver error; atmospheric/ionospheric errors; selective availability errors (if enabled); and ephemeris errors. Because these errors change over time, it is desirable to minimize the time between acquisition and error correction.

During calibration, the GPS receiver 42 continuously calculates its apparent position. The antenna 44 is placed at a known location. The difference between the apparent position and the known location is the current error correction. This technique is known as "differential GPS" and has been applied in land surveying techniques. Because the satellites are so high compared to the distance between the cup locator receiver 62 and the calibration receiver 44, this error correction accounts for most of the possible errors in the system. With an uncorrected accuracy of 10-15 meters, the calibrated or corrected accuracy should be less than 5 meters in all cases, and often approaching 1 meter accuracy.

Figure 7A:
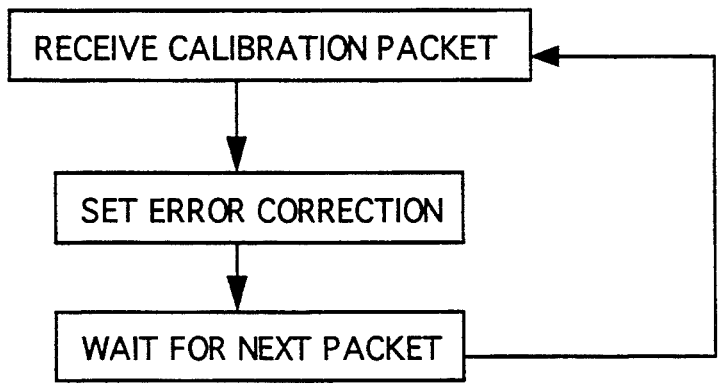
FIG. 7A is a flow chart of the calibration sequence.

When players are on the course, the current error correction is transmitted periodically to all remote units 10 on the packet radio network (FIG. 5). Preferably, once every five seconds a 0.5 second window is opened on each remote unit 10 for reception of the current error correction. The flow chart of the calibration software routine is illustrated in FIG. 7A where the calibrate loop is run every 5 seconds.

Turning to FIG. 2 the remote unit is preferably mounted on a golf cart. Current hardware technology dictates a size, weight, and power requirement that makes golf cart mounting the most feasible. However, minaturization should enable an embodiment that is hand held in the near future.

Figure 7B:
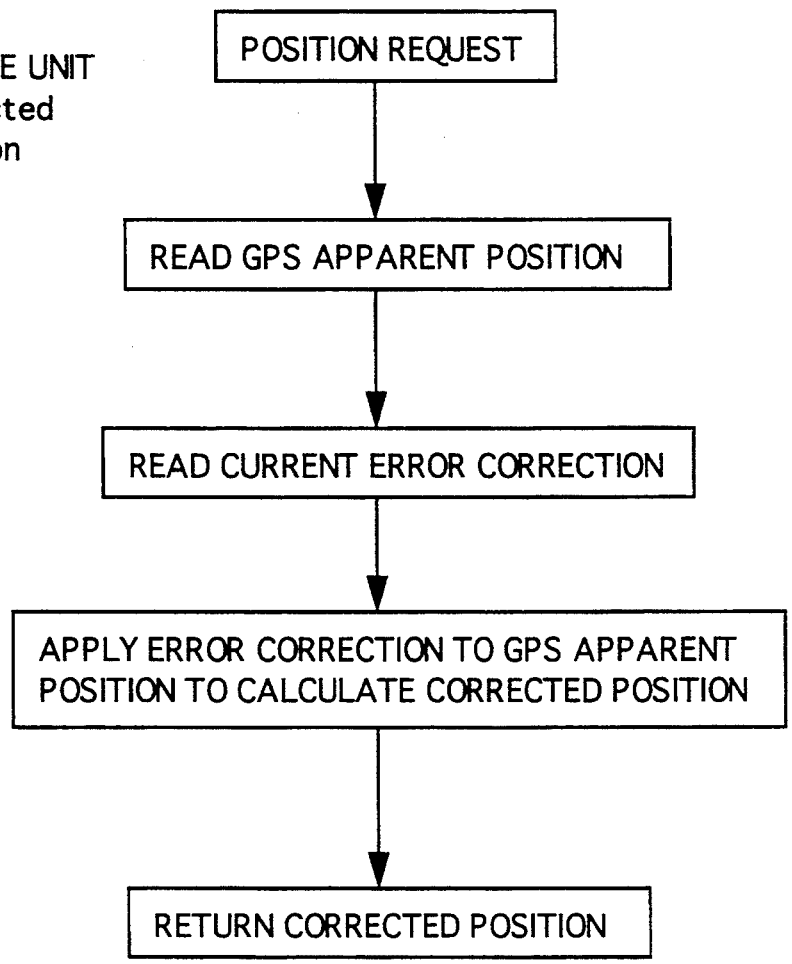
FIG. 7B is a flow chart of the method for determining the corrected position of the remote unit.

The remote unit 10 preferably continuously operates to calculate the distance from the unit 10 to the cup on the hole being played. As shown in FIG. 7B the GPS receiver 22 determines an apparent position and then reads the current error correction stored in memory 25. The CPU 24 applies the current error correction to the apparent position to calculate a corrected position. The corrected position is compared to the corrected cup location retrieved from memory 25 and the difference is determined and shown as the distance on display 26. In FIG. 1, the far left space in box 30 shows the distance from the remote unit 10 to the cup. Preferably, the remote unit 10 is placed as close as possible to the ball so the distance readout in box 30 "CART TO PIN" is an accurate reflection of the distance of the ball to the pin.

The player can also visually track the progress of the icon 33—representing the remote unit 10 as the golf cart progresses on the hole layout from tee 32 to green 101. For shot planning, the player can mark a location (e.g. "A") on the display 26 using the pointing device 28. The CPU calculates an approximate distance from the icon 33 to the mark "A" and displays the distance to the player in the space of box 30 labeled "CART TO A".

For example, FIG. 1 represents a 520 yard par 5 with water 102 on the left side and in front of an elevated green 101. Trees 103 in the rough 104 and the fairway 105, as well as a trap 107 in front of the green are factors. If the player hits to position A and positions the remote unit 10 near the ball, the far left space in box 30 might read 230. This does not necessarily mean the player hit a 290 yard drive. The 230 yard reading is the direct line from the remote unit 10 (adjacent the player's ball) to the cup 106, which is placed at the front of the green 101. Additionally, the tee markers might have been placed forward of the nominal 520 yard placard.

The player might mark the display 26 at position B with the pointing device 28. The far right space on box 30 labeled "B TO PIN" would read the approximate distance 175. The preferred embodiment is configured such that if the player marks "B" with the pointing device 28, both the approximate distance from the cup/pin 106 to position B as well as the approximate distance from "A" to "B" is shown in box 30. This feature allows a player to quickly and effectively consider his options—for example the player might attempt a fairway wood from "A" to the green 101 or layup to position B for a wedge to the length of the green 101.

Figure 7C:
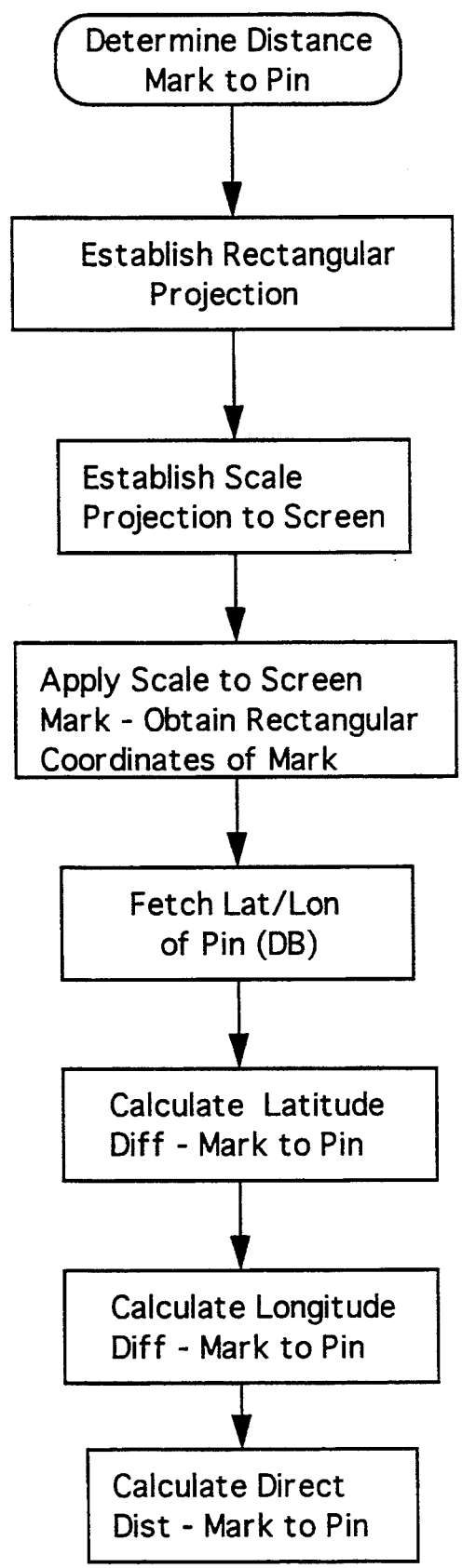
FIG. 7C depicts the method for determining the distance from the cup to the mark A.
Figure 7D:
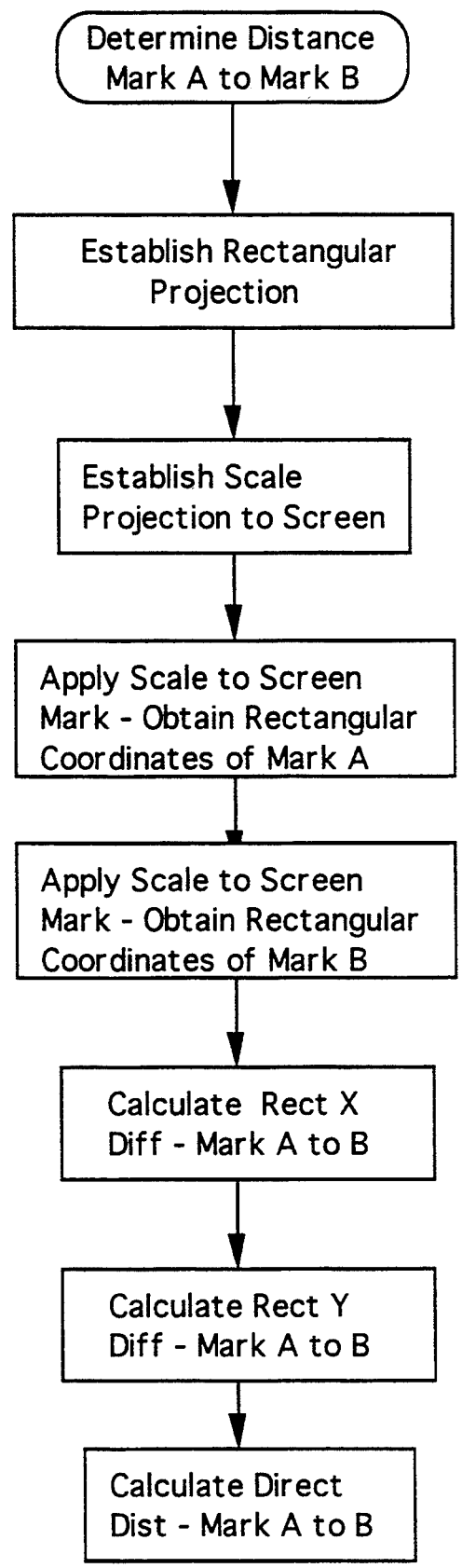
FIG. 7D shows the flow chart for the method for determining the distance marks A and B.

FIG. 7C illustrates the flow chart for determining the distance from the mark "A" to the pin, while FIG. 7D depicts the determination of the distance from mark "A" to mark "B". The method for determining the distance from the remote unit 10 to the mark "A" is almost identical to the method of FIG. 7C with the position of the cart compared to the Mark coordinates instead of the position of the pin.

The accuracy of determining a distance to a "mark" is one pixel, while the accuracy between "marks" is two pixels. The actual distance accuracy is dependent upon screen resolution and scale. There are several conventional methods for determining distance between marks on a screen or monitor, with FIGS. 7C and 7D using the approach illustrated in FIG. 9.

Figure 9:
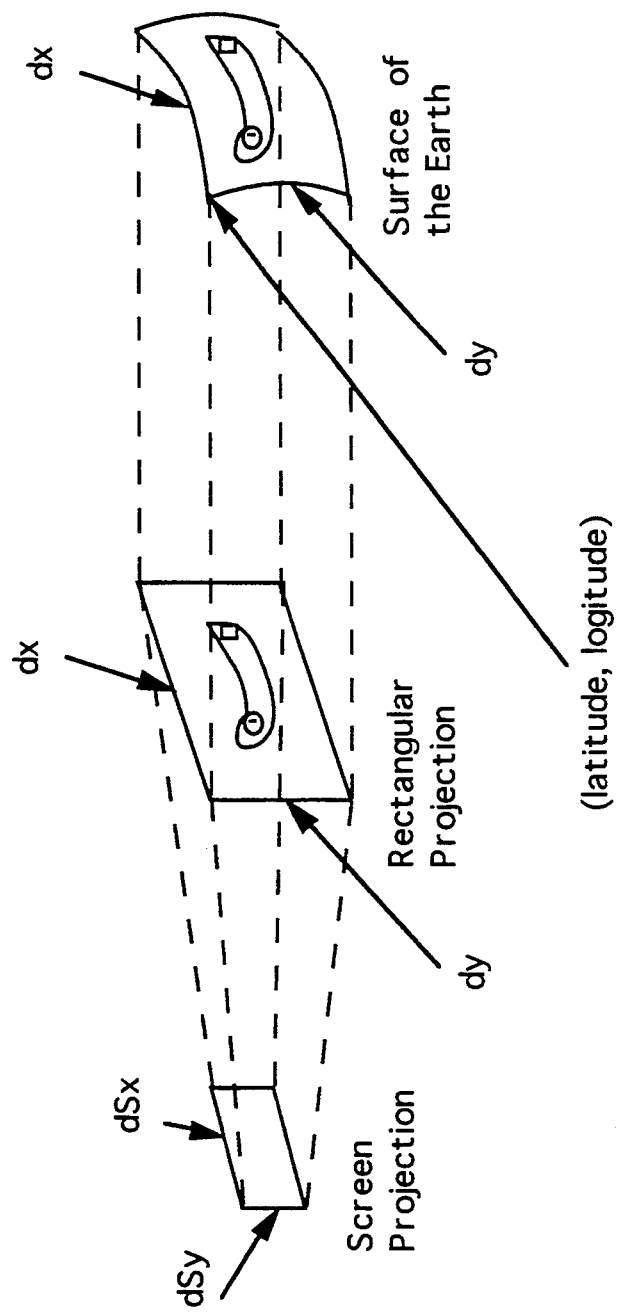
FIG. 9 schematically illustrates the projection methodology of the preferred embodiment.
Figure 10:
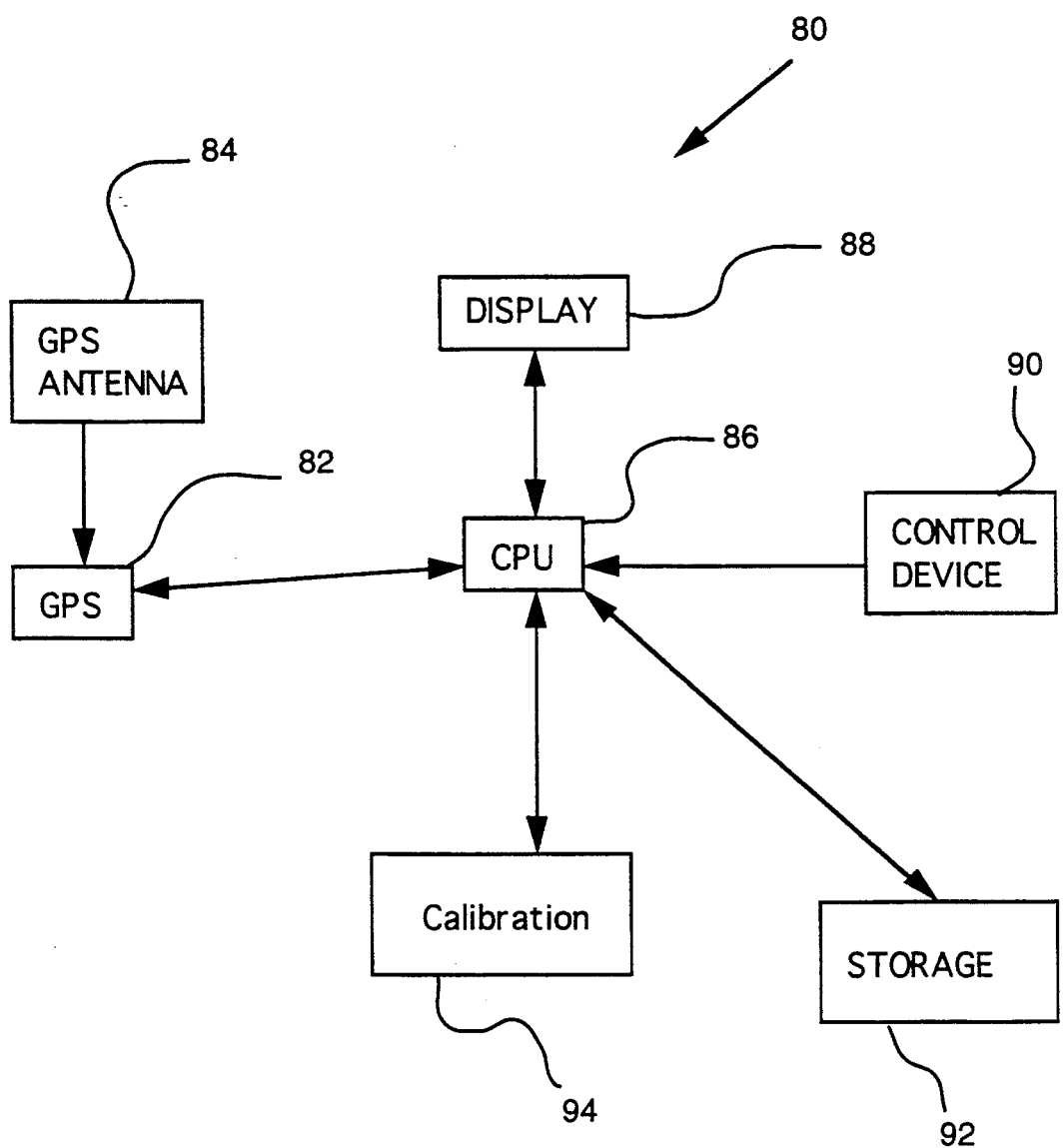
FIG. 10 is a block diagram describing an alternative embodiment of the remote unit which includes an internal calibration mechanism.

In FIG. 9 a rectangular projection is defined as a grid encompassing the entire hole being played with the latitude and longitude of an origin defined. The units of the rectangular projection are real numbers that correspond to actual distances from the origin.

The pixels on the screen (SP) can be mapped to the rectangular projection points (RP) as:

$$RP_x = \dot{m}_x SP_x + b_x \quad RP_y = m_y SP_y + b_y$$

where $$m_x = \frac{dx}{dS_x} \quad m_y = \frac{dy}{dS_y}$$

$$b_x = dx - m_x dS_x \quad b_y = dy - m_y dS_y$$

As shown in FIGS. 7C and 7D the scale is applied to the screen mark to obtain the rectangular coordinates of the mark. The distance is then simply calculated between the rectangular coordinates for the two marks, mark to pin, or cart to mark.

It should be readily appreciated that a similar procedure is used to map a coordinate onto the screen. This need arises when the cup/pin position is input into the database and to display the position of the remote unit (icon33) on the hole layout. The rectangular coordinates are mapped to the screen as:

$$SP_x = \frac{1}{m_x} RP_x + B_x \quad SP_y = \frac{1}{m_y} RP_y + B_y$$

where $$B_x = dS_x - \frac{1}{m_x} dx \quad B_y = dS_y - \frac{1}{m_y} dy$$

In the preferred embodiment the remote unit 10 continuously calculates and displays a distance from the unit 10 to the cup, it receives a current error correction every 5 seconds, and additionally, transmits a current position to the base station every 5 seconds. This allows the course marshal or pro to view the monitor in FIG. 3 and consider the position of every remote unit on the course.

ALTERNATIVE EMBODIMENTS

FIG. 9 illustrates an alternative embodiment remote unit 80 which is preferably mounted on a golf cart. In the system of FIG. 9 the base station is eliminated as well as the packet radio system. The remote unit 80 includes a GPS receiver 82, GPS antenna 84, CPU 86, display 88, control device 90, storage 92 and calibration 94. The hardware is preferably the same as in the preferred embodiment except as noted.

In particular, the storage 92 similarly contains a course geography database, but in addition contains the location of a calibration location for each hole. Such a calibration location is preferably a placard on the ground in the cartpath adjacent the tee box for the hole being played. In the alternative embodiment, a control device like FIG. 8 is used with keypad "6" being additionally labeled with the notation "Calibrate." The calibrate box 94 in FIG. 9 is preferably EEPROM and contains the calibration routine of FIG. 6.

Of course the calibration routine could alternatively be stored in Storage 92.

In use, the present position of the cups for each hole is loaded in the course geography database in storage 92. Preferably the cup locator of FIG. 4 is used with the packet radio system eliminated. The cup locations are stored in memory 66 and transferred to the remote unit 80. Without calibration and with a C/A code receiver 82, the remote unit 80 will give distance accuracies within 100 meters (S/A enabled) and within 20 meters (S/A disabled). Of course technical improvements in GPS technology might improve on this accuracy to some degree.

Figure 6:
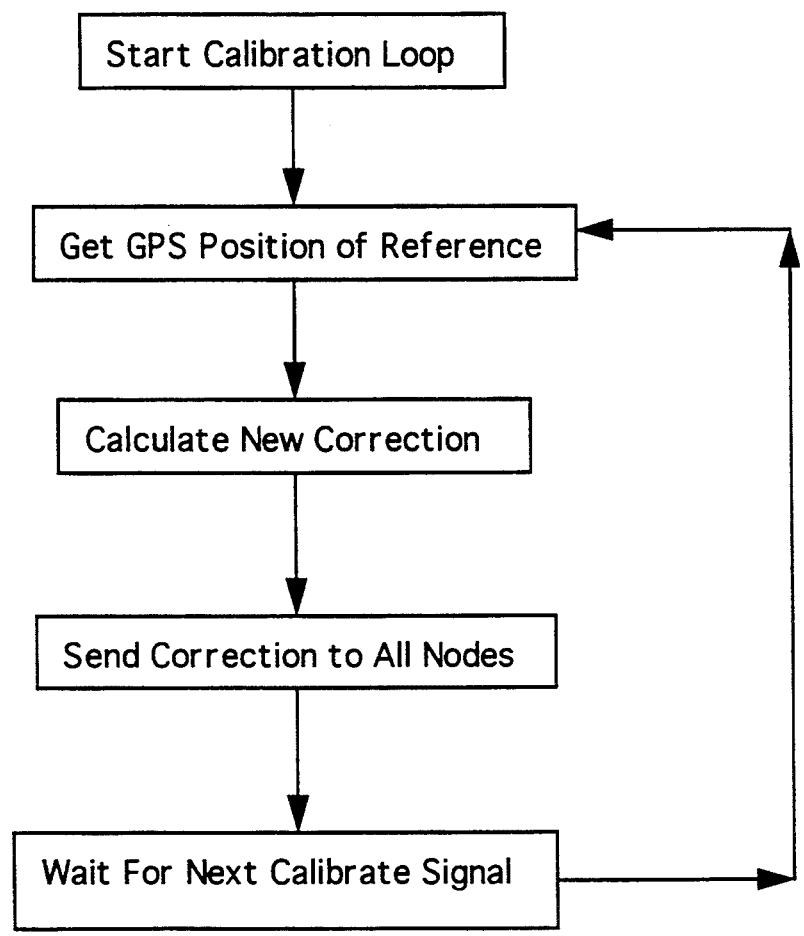
FIG. 6 is a flow chart depicting the operation of the calibration sequence for determining the error correction.

To improve these accuracies a calibration procedure is utilized. The golfer drives the golf cart containing the remote unit 80 over a placard in the cart path, calls up the display for the hole being played, and presses "Calibrate" pad 6. The routine of FIG. 6 is initiated, and an error correction is determined by comparing the current apparent GPS position with the GPS position stored for the hole placard. This calibrate procedure gives a reasonably accurate error correction for the duration of play for the hole. If a player forgets to calibrate for a hole the previous error correction is simply carried over and applied.

Other alternatives are of course possible. By way of nonlimiting example, the display 26 can be replaced with a simple LED which only displays distance from the remote unit to the cup. Additionally, the cup locator unit 14 can be eliminated with the greenskeeper simply manually entering the approximate grid coordinates of each cup into the base station 12.

We claim:

1. A method for determining the approximate distance of a golf ball to a golf cup using a global positioning satellite system comprising the steps of:
   locating the position of the cup;
   storing the position of the cup;
   positioning a remote global positioning satellite receiver near the golf ball;
   determining a position of the remote receiver using the global positioning satellite system; and determining the distance from the remote receiver to the cup using the stored cup position and the position of the remote receiver.

2. The method of claim 1, including the step of determining an error correction for the global positioning satellite system comprising the substeps of
positioning a global positioning satellite receiver at a reference location having a known position,
determining the apparent position of the reference location using the receiver, and
calculating an error correction based on the apparent position and the known position of the reference location.

3. The method of claim 2, including:
calculating a corrected position of the cup using the error correction, and said distance determing step using the corrected cup position.

4. The method of claim 2, wherein said error correction is transmitted from the reference location to the remote receiver for calculating the corrected position of the remote receiver.

5. The method of claim 2, the error correction determining step including the substeps of
positioning the remote receiver at a reference location having a
known position,
determining the apparent position of the reference location using the remote receiver,
calculating an error correction based on the apparent position and the known position of the reference location,
storing the error correction in the remote receiver;
the corrected position of the remote receiver positioned near the golf ball being calculated using the stored error correction.

6. The method of claim 5, the error correction determining step including the sub-step of positioning the remote receiver at a reference location a near tee box.

7. The method of claim 2, wherein said storing step includes storing the cup position in a memory in the remote receiver and said position determining step occurs in the remote receiver.

8. The method of claim 1, wherein said locating and storing steps include locating the position of a plurality of cups and storing the position of each cup.

9. The method of claim 1, wherein said locating step includes positioning a global positioning satellite system receiver near the cup and determining the apparent position of the receiver using the global positioning satellite system.

10. The method of claim 1, including the step of displaying the distance between the remote receiver and the cup.

11. The method of claim 1, said golf cup being located on a golf hole, the method including the step of displaying a golf hole layout for said golf hole, the position of the cup on the layout, and the position of the remote receiver on the layout.

12. The method of claim 11, including the step of loading into memory of the remote receiver a digital map of the course which includes hazards.

13. The method of claim 12, including the step of determining the approximate distance of a golf ball to a target on the golf hole layout including the substeps of:
marking a target location on the hole layout;
determining a distance from the remote receiver position to the target location.

14. The method of claim 13, wherein the target is a location of a hazard on the golf hole layout.

15. An apparatus for determining the approximate distance to a golf cup using a global positioning satellite system comprising:
a global positioning receiver means for receiving signals indicative of the apparent position of the receiver means using the global positioning satellite system;
memory means for storing the position of the golf cup;
means linked to said global positioning receiver means and said memory means for calculating the distance between the position of the receiver means and the position of the golf cup; and
display means for displaying the distance.

16. The apparatus of claim 15, said calculating means being operable for applying an error correction to determine a corrected position of the receiver means.

17. The apparatus of claim 15, said calculating means comprising a microprocessor for determining the apparent position of the receiver means.

18. The apparatus of claim 15, said display means being operable for displaying a graphic representation of the layout of a golf hole.

19. A system for determining locations on a golf course comprising:
a plurality of remote receivers for receiving global positioning signals from a global positioning satellite system and each remote receiver including a transmitter;
a base station:
means liar communicating data between said remote receiver transmitters and said base station, the base station including means for receiving global positioning data of a remote receiver from said communicating means and for displaying the location of said remote receiver on said golf course.

20. The system of claim 19, a number of said remote receivers including a microprocessor for determining the position of a respective remote receiver using said global positioning signals.

21. The system of claim 20, said number of remote receivers each including a database of golf cup locations, said microprocessor calculating the distance between a golf cup and a remote receiver using a respective golf cup location and remote receiver position.

22. The system of claim 19, said base station including a microprocessor for accepting global positioning signals from a number of said remote receivers and for determining the location of the respective remote receiver.

23. The system of claim 22, the base station including a database of golf cup locations on said golf course, said microprocessor calculating the distance between a remote receiver and a golf cup location.

24. The system of claim 19, including a reference receiver means positioned at a known position for receiving signals from the global positioning satellite system to determine a reference apparent position and for calculating an error correction based on the difference between the known position and the apparent position.

25. The system of claim 24, a number of said re,note receivers including a display and means for calculating a correct position of a respective remote receiver on said golf course using said error correction.

26. The system of claim 25, said number of remote receivers each including a database of golf cup locations on said golf course, and means for calculating the distance between a correct position of a remote receiver and a golf cup location, said distance being indicated on said display.

* * * * *

EX PARTE REEXAMINATION CERTIFICATE (8657th)
United States Patent
Huston et al.

(10) Number: US 5,364,093 C1
(45) Certificate Issued: Nov. 15, 2011

(54) GOLF DISTANCE MEASURING SYSTEM AND METHOD

(75) Inventors: Charles D. Huston, Austin, TX (US); Darryl J. Cornish, Austin, TX (US)

(73) Assignee: LV Administrative Services, Inc., New York, NY (US)

Reexamination Request:
No. 90/009,263, Aug. 25, 2008

Reexamination Certificate for:
Patent No.: 5,364,093
Issued: Nov. 15, 1994
Appl. No.: 07/804,368
Filed: Dec. 10, 1991

(51) Int. Cl.
*G01S 5/14* (2006.01)
*A63B 71/06* (2006.01)

(52) U.S. Cl. .............. 473/407; 340/323 R; 342/357.25; 342/357.57; 473/409; 701/120; 701/213; 701/215

(58) Field of Classification Search .................. 473/407; 340/323; 342/357.03, 357.08; 761/120, 213, 761/215
See application file for complete search history.

(56) References Cited

To view the complete listing of prior art documents cited during the proceeding for Reexamination Control Number 90/009,263, please refer to the USPTO's public Patent Application Information Retrieval (PAIR) system under the Display References tab.

*Primary Examiner* — Matthew C. Graham

(57) ABSTRACT

A method and system for determing the approximate distance from a golf ball to the golf cup on the golf-green is described. The system stores the location of the golf cup in computer memory and determines the location of a global positioning satellite receiver positioned near the golf ball. The system calculates the distance between the golf cup location and the receiver location. Preferably, the receiver includes a display of the golf hole being played, with the location of the receiver on the hole, the golf cup on the green, and the distance to the golf cup being displayed. In a preferred form the player can designate a mark on the display and find out the distance from the receiver to the mark or the distance from the mark to the golf pin. The position of the receiver is error corrected, with the error correction preferably calculated using a reference global positioning satellite receiver positioned at a known location. The known location is compared to the apparent position to calculate the error correction. The error correction is periodically transmitted and the remote receiver calculates the distance from the remote receiver to the golf cup for the hole being played using the transmitted error correction. Using an error corrected position enables distance calculaton accuracy to within several meters even using global positioning satellite system "c" code with selective availability enabled. The method and system of the present invention allows the golfer to accurately select the proper club for the shot, plan a shot strategy for the hole, and to decrease playing time.

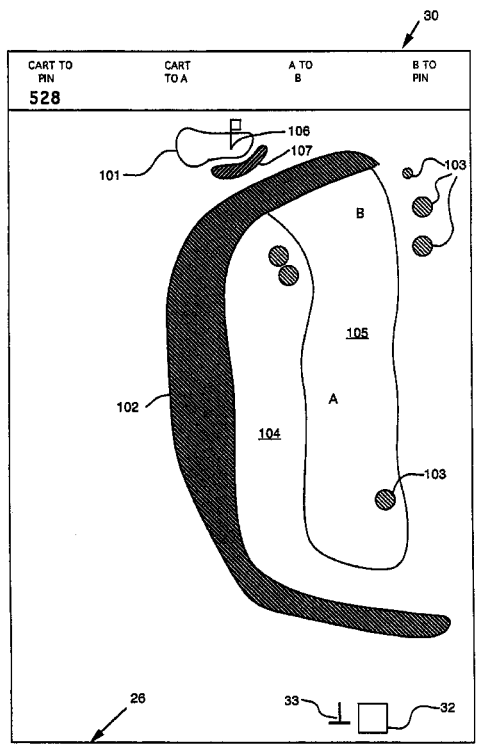

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 8-14 is confirmed.

Claim 15 is determined to be patentable as amended.

Claims 16-18, dependent on an amended claim, are determined to be patentable.

Claims 2-7 and 19-26 were not reexamined.

15. An apparatus for determining the approximate distance to a golf cup using a global positioning satellite system *and for displaying the distance to a golfer during play* comprising:

a global positioning receiver means for receiving signals indicative of the apparent position of the receiver means using the global positioning satellite system;

memory means for storing the position of the golf cup;

means linked to said global positioning receiver means and said memory means for calculating the distance between the position of the receiver means and the position of the golf cup *during play*; and display means for displaying the distance *to said golfer during play*.

* * * * *